(12) United States Patent
Pelchen et al.

(10) Patent No.: US 7,125,358 B2
(45) Date of Patent: Oct. 24, 2006

(54) DISTRIBUTOR TRANSMISSION HAVING AT LEAST THREE SHAFTS

(75) Inventors: Christoph Pelchen, Tettnang (DE); Uwe Griesmeier, Markdorf (DE); Ulrich Mair, Friedrichshafen (DE); Ünal Gazyakan, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 75 days.

(21) Appl. No.: 10/834,513

(22) Filed: Apr. 29, 2004

(65) Prior Publication Data

US 2004/0220007 A1    Nov. 4, 2004

(30) Foreign Application Priority Data

May 2, 2003    (DE)   ................. 103 19 681

(51) Int. Cl.
*F16H 48/04*    (2006.01)

(52) U.S. Cl. ..................................... 475/150

(58) Field of Classification Search ............ 475/2, 475/4, 5, 6, 150, 151, 153, 248, 249; 903/916, 903/910, 911; 180/65.1, 65.2, 65.6, 243, 180/248

See application file for complete search history.

(56) References Cited

U.S. PATENT DOCUMENTS

| 5,584,776 | A  |   | 12/1996 | Weilant et al. |
| 5,954,612 | A  | * | 9/1999  | Baxter, Jr. ................ 475/198 |
| 6,589,128 | B1 | * | 7/2003  | Bowen ....................... 475/5 |
| 6,648,785 | B1 | * | 11/2003 | Porter ........................ 475/5 |
| 6,896,635 | B1 |   | 5/2005  | Tumback |

FOREIGN PATENT DOCUMENTS

| DE | 196 11 058 A1 | 9/1996 |
| DE | 100 80 426 T1 | 7/2001 |
| DE | 102 41 457 A1 | 3/2004 |

* cited by examiner

*Primary Examiner*—Sherry Estremsky
(74) *Attorney, Agent, or Firm*—Davis & Bujold, P.L.L.C.

(57) ABSTRACT

A distributor transmission (8) having at least three shafts (11, 12, 13) for distributing a drive torque (M_GE) as needed to at least two drive axles (4, 5). A first shaft (11) is operatively connected with the first drive axle (5) and can be loaded with the drive torque (M_GE). The second shaft (12) is operatively connected with the second drive axle (4) and a torque (M_E) of a machine device (14) on a third shaft (13) can be applied which influences a degree of distribution (P_VA/P_GES) of the drive torque (M_GE) between the drive axles (4, 5).

7 Claims, 3 Drawing Sheets

DISTRIBUTOR TRANSMISSION HAVING AT LEAST THREE SHAFTS

This application claims priority from German Application Ser. No. 103 19 681.1 filed May 2, 2003.

1. Field of the Invention

The invention concerns a distributor transmission having at least three shafts for distributing a drive torque to at least two drive axles as needed.

2. Background of the Invention

In power trains of vehicles known from the practice, a drive torque produced by a prime mover is transmitted via a transmission to the drive wheels. If vehicles like four-wheel passenger cars or four-wheel trucks are designed with several driven axles, the power of the prime mover in the power drive of such vehicles is distributed to the individual drive axles and the different drive wheels.

The specified power distribution is generally carried out with so-called differential transmissions, the longitudinal differential transmissions, seen in travel direction, being used for longitudinal distribution of the input of the prime mover to several driven vehicle axles. So-called transverse differentials or differential transmissions are provided in relation to the travel direction of the vehicle for a transverse distribution of the input to the drive wheels of a vehicle axle.

The designs of differential transmission, conventional in the practice, are so-called bevel gear differentials, spur gear differentials in planetary design, or also worm gear differentials. Spur gear differentials are especially used mostly as longitudinal differentials because of the possibility of asymmetric torque distribution. In the meanwhile, bevel gear differentials constitute the standard for a transverse compensation in vehicles and worm gear differentials are used both for longitudinal distribution and for transverse distribution.

By means of the longitudinal distributor differentials, a drive torque can be distributed in arbitrary ratios to several drive axles so as to prevent stresses in a power drive.

Opposed to this advantage stands the disadvantage that for variable longitudinal distribution of a drive torque, a longitudinal distributor differential is designed with a frictional shifting element or a frictional multi-disc clutch which, during an unequal torque distribution between two drive axles of a vehicle, are held substantially in a greatly wasteful slip operation whereby an effectiveness of a power train is sharply reduced.

Therefore, the problem on which this invention is based is to make a distributor transmission available by means of a drive torque which can be distributed as needed to several drive axles causing only minor energy losses in the process.

SUMMARY OF THE INVENTION

With the inventive distributor transmission having at least three shafts for distributing as needed a drive torque to at least two drive axles, it is possible to carry out, almost without loss, a variable distribution of the drive torque between two drive axles.

This is achieved by the fact that one shaft of the distributor transmission is operatively connected with a machine device by which a torque that influences a degree of distribution of the drive torque between the drive axles can be produced upon the shaft almost without loss.

The reduction of the power losses, compared to the longitudinal distributor transmission known from the practice, results from the fact that input or parts of the drive torque of a prime mover, do not, as was formerly usual, vaporize as frictional heat in a frictional shifting element of a power train, but are applied to the drive axles via the support torque applied by the machine device.

The input of the machine device can be reduced in an adequate manner, preferably via suitable reduction ratios, between a drive unit of the machine device and the shaft, in a manner such that the losses occurring, which correspond to one of the input of the machine device during distribution of the drive torque between the drive axles, are small compared to the power losses in a frictional shifting element of a longitudinal distributor transmission known from the practice.

The inventive distributor transmission has the added advantage that with it a traction of a vehicle can be substantially improved and specially a start off in unfavorable operational states is made possible for the first time. With the distributor transmission, in the case of a drive axle of a vehicle spinning due to unfavorable road conditions, it is possible, by adequate adjustment of the torque of the machine device, to supply the drive torque to a non-spinning axle. In critical driving situations, a torque distribution between several drive axles can be adjusted under control and/or regulation so that a safety in driving can be easily increased according to the situation compared to conventional drive shafts.

BRIEF DESCRIPTION OF THE DRAWINGS

The invention will now be described, by way of example, with reference to the accompanying drawings in which.

DETAILED DESCRIPTION OF THE INVENTION

Figure 1:
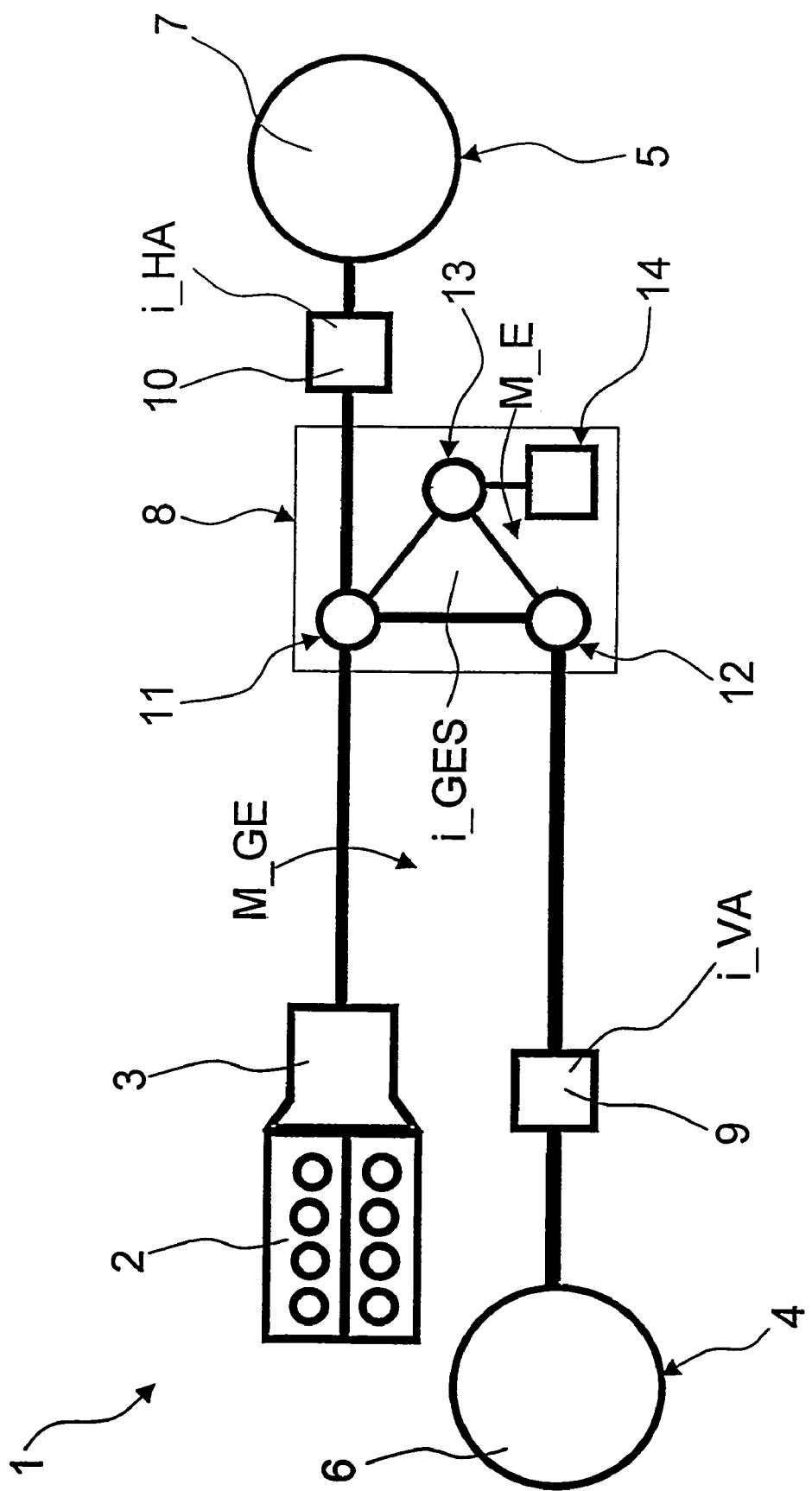
FIG. 1 is an extensively schematized representation of a power train of a vehicle.

FIG. 1 shows a schematized power train 1 of a four-wheel drive vehicle. The power train 1 comprises one transmission unit or internal combustion engine 2 and one main transmission 3 which can be any known transmission from the practice.

Between the main transmission 3 and two drive axles 4, 5 of the vehicle, which are connected upon each vehicle side with at least one drive wheel 6, 7, there is situated a distributor transmission 8 made as summarizing transmission for variable distribution as needed of a drive torque or of a transmission output torque of the main transmission 3 to the two drive axles 4 and 5 and thus also to the drive wheels 6 and 7. Between the drive axles 4 and 5 and the distributor transmission 8 is further provided one transverse transmission 9, 10 in a design in order to transmit the part of the drive torque fed respectively to the drive axles 4 and 5 to the drive wheels 6 and 7 via the drive axles 4 and 5 and distribute it between the drive wheels 6 or 7 of a drive axle 4 and 5, respectively.

The distributor transmission 8 has three shafts 11, 12 and 13, the first shaft 11 being operatively connected with the drive axle 5 and it can be loaded with the drive torque or transmission output torque of the main transmission 3. The second shaft 12 of the distributor transmission 8 is operatively connected with the drive axle 4 and the third shaft 13 is connected with a machine device 14 which can be applied to the third shaft 13 of the distributor transmission; a torque that influences the degree of distribution of the drive torque between the two drive axles 4 and 5.

Figure 2:
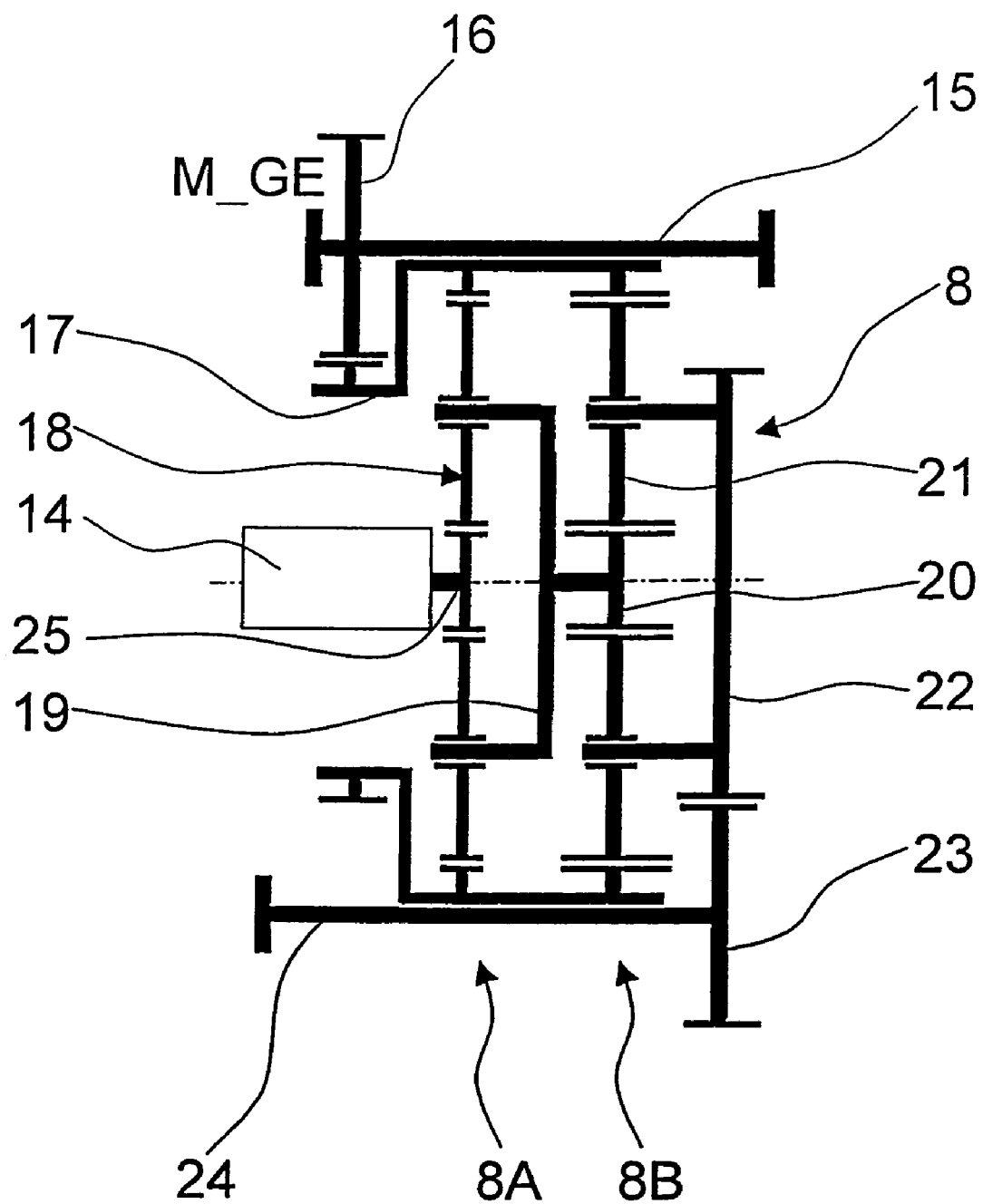
FIG. 2 is a gear diagram in detailed representation of a distributor transmission of the power train according to FIG. 1.

Referring to FIG. 2, it shows an extensively schematized gear diagram of the distributor transmission 8 shown in FIG. 1. In the embodiment of the distributor transmission 8 shown in FIG. 2, the distributor transmission 8 is designed as a double planetary gear set; it evidently being at the expert's discretion to arrange the distributor transmission 8 with a different adequate design with which the specified working principle can be accomplished.

A drive torque or a transmission output torque M_GE of the main transmission 3 (not shown in detail in FIG. 2) is transmitted via a countershaft 15 directly to the drive axle 5 (likewise not shown in detail), which constitutes the rear axle of the vehicle. Besides, the transmission output torque M_GE is transmitted via a spur gear 16 fixedly connected with the countershaft 15 to a ring gear 17 of the distributor transmission 8. The ring gear 17 is designed as common ring gear for both planetary gear sets 8A and 8B of the double planetary gear set 8 or of the distributor transmission and corresponds to the first shaft 11 of FIG. 1. With the ring gear 17 mesh planetary gears 18 of the planetary gear set 8A which are rotatably supported on a planet carrier 19. The planet carrier 19 of the planetary gear set 8A is operatively connected with a sun gear 20 of the second planetary gear set 8B.

In addition, with the ring gear 17 mesh planetary gears 21 of the planetary gear set 8B which are rotatably supported on a planet carrier 22 of the planetary gear set 8B which corresponds to the second shaft 12 of FIG. 1. The planet carrier 22 of the planetary gear set 8B is, in turn, engaged via a spur gear 23 with a countershaft 24 so that a drive torque transmitted via the distributor transmission 8 to the countershaft 24 is passed to the drive axle 4 which constitutes the front axle of the vehicle.

The planetary gears 18 of the planetary gear set 8A additionally mesh with a sun gear 25 of the planetary gear set 8A. The sun gear 25 is in operative connection with the machine device 14 designed as an electric motor in a manner such that when current is supplied to the electric motor 14, one torque M_E is introduced via the sun gear 25 in the distributor transmission 8.

This means that via the electric motor 14, a support torque can be applied to the sun gear 25 of the planetary gear set 8A depending on which the drive torque M_GE, or at least part of the drive torque M_GE, can be transmitted via the distributor transmission 8 to the countershaft 24 and thus to the drive axle 4.

Alternative to this it obviously it is also possible that the machine device be designed as a hydraulic machine or as any other machine with continuously variable drive torque to make adjusting possible between the two drive axles 4 and 5 an arbitrary distribution of the drive torque M_GE.

An advantage of the design of the machine device 14 as electric motor is that an electric motor can be operated both as generator and as motor. If the electric motor is designed with an intelligent energy management, the electric motor can be to a great extent, automatically operated by an electric circuit of a vehicle. It can thus be provided that the electric motor, when operating as generator, loads an energy memory, for example, a battery or a capacitor, and when operating as motor, be fed by the energy memory.

With the design of the distributor transmission 8 (shown in FIG. 2), the output of the power train 1 is designed upon the drive axle 5 as rigid and direct through drive from the transmission output of the main transmission 3 to the drive axle 5. The output on the drive axle 4 of the vehicle is realized via the summarizing transmission or the distributor transmission 8 with the machine device 14. By adequate setting of a torque produced by the machine device 14, the distribution of the drive torque between the two drive axles 4 and 5 of the vehicle can be arbitrarily adjusted.

The transmission output torque M_GE is thus transmitted up to 100% to the drive axle 5 when the torque M_E of the machine device is zero since, in this case, there is no support torque on the sun gear 25 which would support and transmit at least part of the drive torque M_GE in direction of the drive axle 4.

If the torque abutting via the machine device 14 on the third shaft 13 of the distributor transmission 8, which in the design of the distributor transmission 8 according to FIG. 2 corresponds to the sun gear 25 of the planetary gear set 8A, is boosted or increased, the drive torque M_GE is increasingly supported and the part of the drive torque M_GE transmitted in direction of the drive axle 4 increases whereas the portion of the drive torque M_GE transmitted to the drive axle 5 diminishes to a great extent.

Starting from a specific value of the torque M_E of the machine device 14, the drive torque M_GE is transmitted up to 100% to the drive axle 4 via the distributor transmission 8 and the portion of the drive torque M_GE fed to the drive axle 4 is zero.

The portion of the drive torque M_GE which is transmitted via the distributor transmission 8 to the drive axle 4 is directly proportional to the torque M_E introduced in the distributor transmission 8 via the machine device 14 whereby the expense for control and regulation is low.

Due to the fact that the distributor transmission 8 is designed as a planetary gear set, the power to be applied by the electric motor 14 is low compared to the maximum output power to be transmitted to the drive axle 4. An electric motor or a machine device 14 with only low input is thus required which needs a small installation space. This, in turn, results in that the distributor transmission 8 can be designed with compact construction and small number of parts.

The design of the distributor transmission with one machine device for variable distribution of a drive torque between two drive axles gives the additional advantage that an input is substantially less compared to a power loss occurring in a slipping clutch of a distributor transmission known from the practice.

In addition, a power to be applied by the machine device can be influenced by the change of a ratio i_VA of the transverse distributor transmission 9 and can preferably be adjusted so that the machine device designed as an electric motor in FIG. 2 can be operated as a generator and as motor almost with the same portions of time and power.

Figure 3:
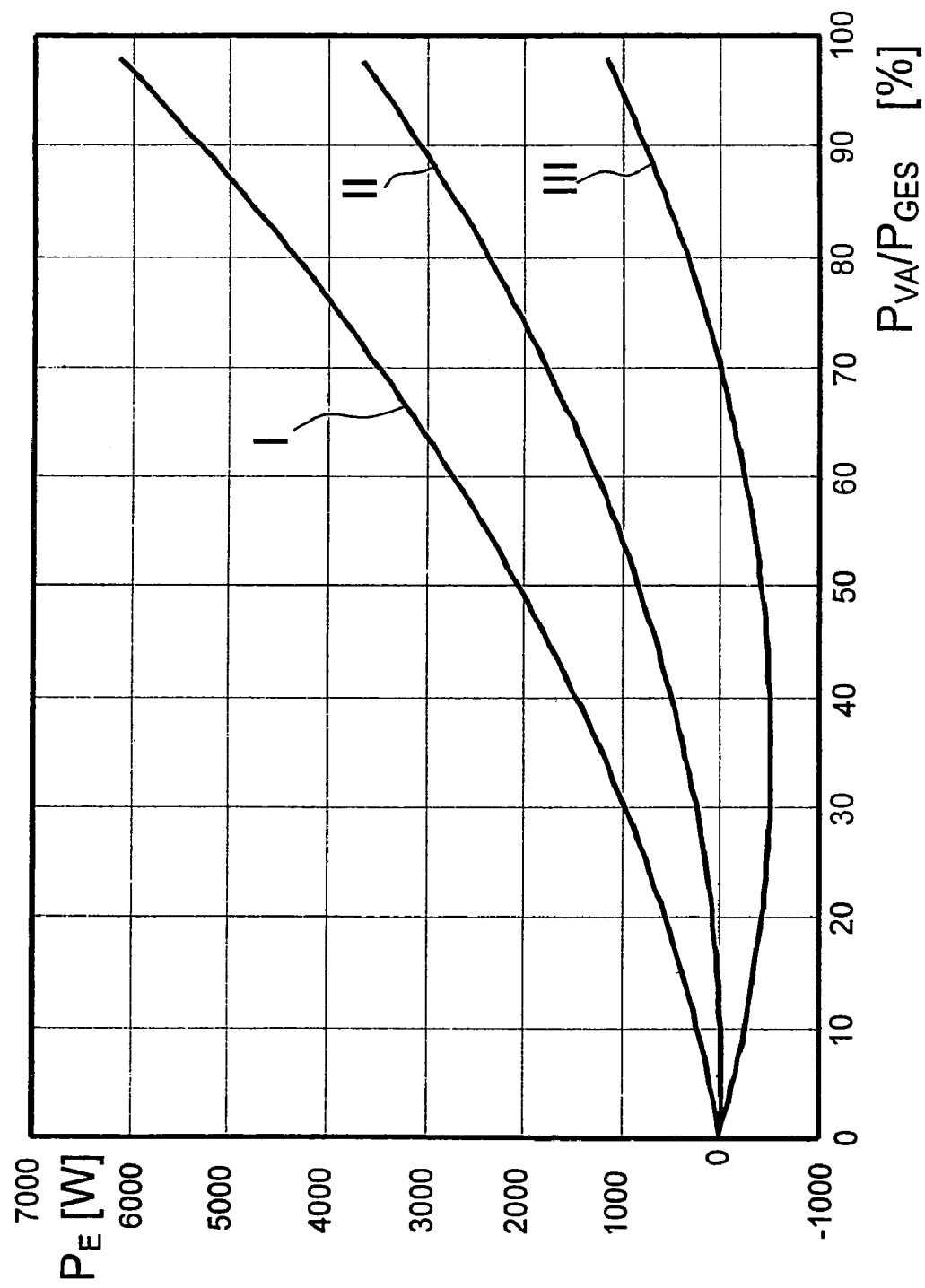
FIG. 3 is a graphic representation of a connection between a power to be applied by the machine device and a distribution degree of the drive torque between two drive axles depending on a ratio of a front-axle differential.

This is made clear by the relationship graphically shown in FIG. 3 between a power P_E of the electric motor and a distribution degree P_VA/P_GES of the drive torque M_GE between the two drive axles 4, 5, the distribution degree is reproducing the portion of the drive torque transmitted via the distributor transmission 8 to the drive axle 4. The three curves I, II and III have been determined in tests conducted with a drive torque of 350 Nm, at a vehicle speed of 180 km/h, an input of the internal combustion engine of 200 KW and a ratio i_HA of the transverse distributor transmission 10 with a value of 4.1.

According to FIG. 3, the three curves I to III are a result of different ratios i_VA of the transverse distributor transmission 9. Starting from the curve I in direction to the curve III, the ratio i_VA of the transverse distributor transmission 9 was reduced while a total ratio i_GES of the distributor transmission 8 remained constant.

From the presentation shown in FIG. 3, it results that the distribution degree of the drive torque between the two drive axles 4 and 5 can be continuously adjusted from zero percent to 100% with the electric motor 14 operating as generator and motor. If the ratio i_VA of the transverse distributor transmission 9 of the drive axle 4 is optimized, the portions of the operation of the electric motor or of the machine device 14 by time unit as generator and as a motor can be adjusted so that the electric motor can be operated as a generator and as motor to similar time units and power portions whereby a power consumption of the electric motor can be kept altogether low in the manner specified.

REFERENCE NUMERALS 1 power train
2 internal combustion engine
3 main transmission
4, 5 drive axle
6, 7 drive wheel
8 distributor transmission, double planetary gear set
8A, 8B planetary gear set
9, 10 transverse distribution transmission
11, 12, 13 shaft
14 machine device or electric motor
15 countershaft
16 spur gear
17 ring gear of the planetary gear set 8A
18 planetary gears of the planetary gear set 8A
19 planet carrier of the planetary gear set 8A
20 sun gear of the planetary gear set 8B
21 planetary gears of the planetary gear set 8B
22 planet carrier of the planetary gear set 8B
23 spur gear
24 countershaft
25 sun gear of the planetary gear set 8A
M_E torque of the machine device
M_GE transmission output torque
i_GES ratio of the distributor transmission
i_VA ratio of the transverse distributor transmission 9
i_HA ratio of the transverse distributor transmission 10
P_E power of the machine device or electric motor
P_VA/P_GES degree of distribution of the drive torque

The invention claimed is:

1. A distributor transmission (8) for distributing an input drive torque (M_GE) from an engine (2) and a main transmission (3) between a first drive axle (5) and a second drive axle (4), the distributor transmission (8) comprising:

a first countershaft (15) connected to the first drive axle (5) for transmitting a first portion of the input drive torque (M_GE) to the first drive axle (5);

a second countershaft (24) connected to the second drive axle (4) for transmitting a second portion of the input drive torque (M_GE) to the second drive axle (4);

a first planetary gear set (8A) and a second planetary gear set (8B) having a first shaft (11) forming a common ring gear (17) for the first and the second planetary gear sets (8A,8B) and driven by the first countershaft (15);

a second shaft (12) formed as a planetary carrier (22) of the second planetary gear set (8B) and driving the second countershaft (24); and a third shaft (13) driving a sun gear (25) of the first planetary gear set (8A) and driven by a machine device torque (M_E) from a machine device (14);

wherein, during operation of the distributor transmission (8), the machine device torque (M_E) controls distributor of the first portion of the input drive torque (M_GE), transmitted to the first drive axle (5), and the second portion of the input drive torque (M_GE), transmitted to the second drive axle (4).

2. The distributor transmission according to claim 1, wherein the first, the second and the third shafts (11, 12, 13) are operatively interconnected so that the drive torque (M_GE), without the device torque (M_E) of the machine device (14), is transmitted entirely to said first drive axle (5).

3. The distributor transmission according to claim 2, wherein the drive torque (M_GE) is increasingly transmitted to said second drive axle (4) with rising as the device torque (M_E) of said machine device (14) increases.

4. The distributor transmission according to claim 1, wherein said machine device (14) is an electric motor, which can be operated as at least one of a generator and a motor.

5. The distributor transmission according to claim 4, wherein a ratio (i_VA of a transverse distributor transmission (9) of said second drive axle (4) is adjusted so that said electric motor is operated as both the generator and the motor.

6. The distributor transmission according to claim 1, wherein at least one transverse distributor transmission (9, 10) is situated between said two drive axles (4, 5) and said first and said second shafts (11, 12) operatively connected therewith.

7. The distributor transmission (8) according to claim 1, wherein a planetary carrier (19) of the first planetary gear set (8A) is connected to drive a sun gear (20) of the second planetary gear set (8B).

* * * * *